Oct. 24, 1939.  J. M. HEUER  2,177,255
EGG SUPPORTING MEANS FOR INCUBATORS
Filed Dec. 30, 1935  2 Sheets-Sheet 1
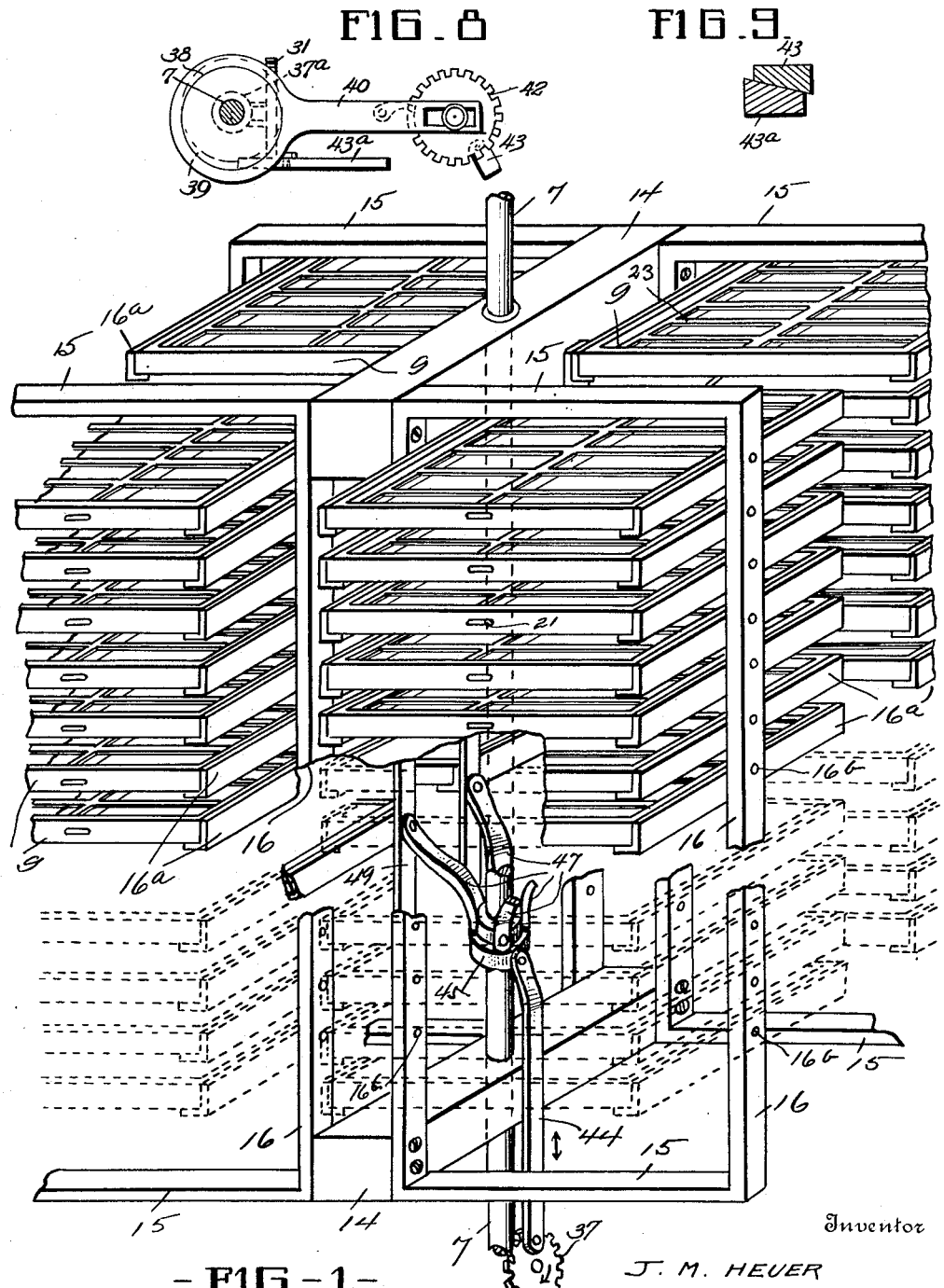
Inventor
J. M. HEUER
By
Attorney Oct. 24, 1939.     J. M. HEUER     2,177,255
EGG SUPPORTING MEANS FOR INCUBATORS
Filed Dec. 30, 1935     2 Sheets—Sheet 2
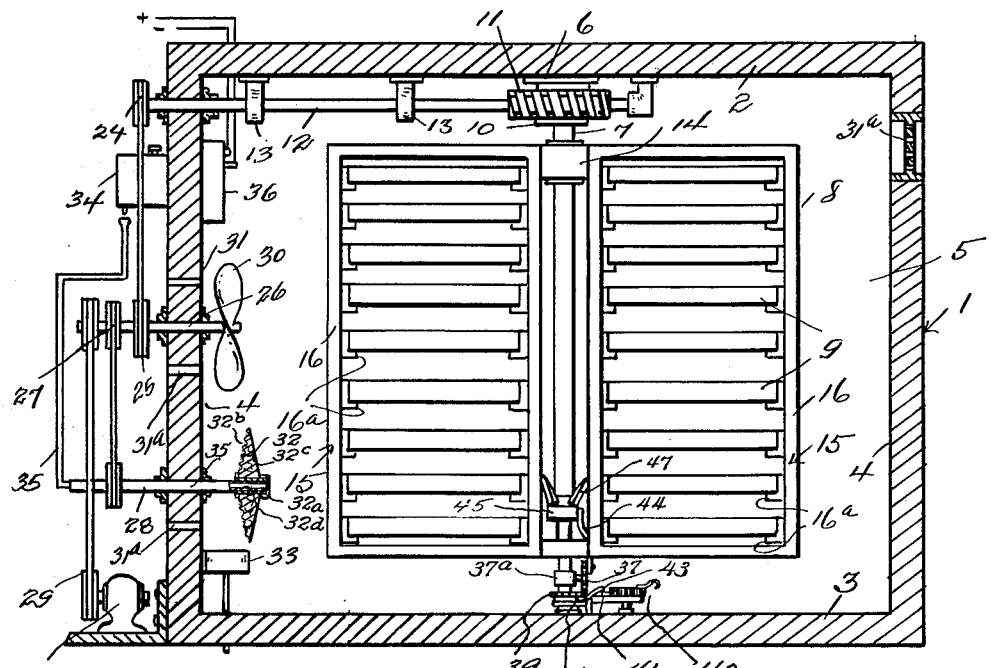
Inventor
J. M. HEUER,
By *[signature]*
Attorney Patented Oct. 24, 2,177,255

UNITED STATES PATENT OFFICE 2,177,255

EGG SUPPORTING MEANS FOR INCUBATORS

John Merlin Heuer, Yoder, Wyo.

Application December 30, 1935, Serial No. 56,781

5 Claims. (Cl. 119—44)

My invention is along the lines of my co-pending application for patent filed June 19, 1933, Serial #676,584, which has become Patent No. 2,126,959, issued Aug. 16, 1938, and is a continuation in part thereof, and has reference to structure for supporting eggs and turning the same, and to such other details of construction as are described but not claimed in my pending application.

In my present invention the incubator cabinet is provided with a rotating frame in which a series of superposed, spaced egg trays is supported to the end that the greatest number of eggs may be incubated in the space afforded by the incubator. The frame is preferably formed with pivoted members on which the several trays are mounted, and these in turn are connected with actuating means whereby the trays are tilted when desired to turn the eggs supported therein. The tiltable elements comprise cooperating tracks for each tray, and are carried by the frame elements; the track members of each frame being pivotally connected to each other for simultaneous movement. The arrangement of the frame, the tracks and the actuating means therefor are unique and especially advantageous since the desired results are obtained with a minimum of mechanical structure and without taking up undue space within the incubator. The trays are provided with means for properly supporting and spacing the eggs, and these supporting and spacing elements are removable. The frame structure is formed of but six major pieces; the upper and lower horizontal supporting beams and the rectangular vertically arranged track and tray carrying members, two extending outwardly from each side of the supporting beams. In practice the entire frame can be cleaned and kept in proper condition, and circulation of air is not interfered with nor retarded, and there are no parts to become broken or deranged, and the trays are subjected to a full draft of moistened and heated air so that the eggs are properly hatched. The foregoing are some of the important advantages of my invention, but others will be apparent as the detailed description proceeds, but the scope of my invention is only to be determined by reference to the claims appended hereto and forming a part of this specification.

In the drawings wherein I have illustrated a preferred form of my invention;

Figure 1 is a perspective view of my frame, and egg supporting and carrying means in perspective and partly broken away to show the arrangement of the parts and the operating mechanism;

Figure 2 is a vertical section through my incubator and shows the relationship of the various parts;

Figure 3 is a detail of the means for tilting the trays;

Figure 4 is a detail of the means for operating the trays shown with the trays in tilted position;

Figure 5 is a sectional view showing the automatic gear, eccentric and catch mechanism for actuating the tilting mechanism at stated intervals;

Figure 6 is a front view of the automatic actuating mechanism;

Figure 7 is a perspective view of a tray showing the egg supporting and spacing member or frame.

Figure 8 is a view of the automatic gear, eccentric, and catch mechanism, looking up from the bottom thereof, and Figure 9 is a section through parts 43 and 43a (plate spring and catch) at the time of engagement.

In the drawings wherein like characters of reference are used to designate like or similar parts;

The numeral 1 designates my cabinet which has a top 2, a bottom 3, end walls 4, and side walls 5. The cabinet may be of any suitable shape or construction. Vertically mounted in anti friction bearing elements 6 in the top 2 and bottom 3 is a shaft 7 carrying a frame 8 on which the egg trays 9 are removably and tiltably mounted. The shaft and frame are rotatable, and the upper end of the shaft 7 has mounted thereon a gear 10 meshing with a worm drive gear 11 on the shaft 12 hung in journal bearings 13 attached to the top of the housing or cabinet. The egg tray carrying frame comprises upper and lower horizontal supporting beams 14 through which the shaft extends, and rectangular vertically arranged track and tray supporting members 15 having top, bottom and side bars; said side bars designated by 16. The side bars 16 have mounted at spaced intervals thereon L-shaped opposed brackets 16a which are each pivotally mounted on the side bars as at 16b and on which the several egg trays 9 are removably supported; said brackets serving as tracks for the trays. Each egg tray has end bars 17 and side bars 18 and a center reinforcing and partitioning member 19; a wire bottom 20 and a name or number plate and handle 21. Further-more each end piece is cut away at its top edge to provide a ledge or abutment 22 on which the egg spacer 23 is seated. The egg spacer 23 is removably seated on the ledges 22 and is formed preferably of longitudinal frame members of wire and a plurality of transverse spacing wires. When the eggs are hatched the spacers are removed.

The drive shaft for the egg tray frame, designated 12, extends outside the cabinet 1 and is connected by a pulley and belt 24 with a pulley 25 on a fan shaft 26. The fan shaft 26 in turn is connected by a pulley and a belt 27 to a moisture disc drive shaft 28. The shafts 12; 26; and 28 are driven from a pulley and belt connection 29 from a small motor 29a. The fan drive shaft 26 extends into the cabinet and carries a fan 30 thereon the purpose of which is to provide circulation of air in the cabinet through ventilators 31 and 31a. The moisture disc drive shaft 28 extends into the cabinet and has mounted thereon a moisture disc 32 which is arranged over a drip pan 33 near the bottom of the cabinet for imparting moisture to the interior of the cabinet and is more particularly shown and described in my co-pending application Serial #676,584. Said moisture disc is mounted on a hub 32a and is formed with a wire frame 32b and a fabric body and face 32c so that moisture is carried to all parts of the disc. A water tank 34 is located outside the cabinet and supplies water to the moisture disc through feed pipes 35, there being suitable openings 32d leading from the pipe through the hub 32a and there is a suitable thermostatically controlled heating element 36 for controlling the temperature within the cabinet.

In order that the egg trays may be tilted at the expiration of a suitable time interval, say every eight hours, I provide automatic means including a main gear 37 carried for free rotation on the collar 37a keyed as at 37b to the main shaft 7 of the frame. An eccentric 38 is also keyed as at 38a to the shaft 7, and above the eccentric, and free to move, is a gear 39 meshing with gear 37. Under ordinary circumstances the gears 37 and 39 simply revolve with the shaft 7. However as the eccentric 38 revolves with the shaft and its shank 40 has the dog 41 pivoted thereon, the dog is moved to engage the ratchet wheel 42 carrying the plate spring 43, revolving the same step-by-step, until plate spring 43 engages the catch 43a moving the same to seat in one of the slots 43b in the gear wheel 39 so that gear 39 is locked against movement with the shaft 7 and imparts rotational movement to gear 37 thereby reciprocating the pitman 44 so that the trays are tilted, since the pitman 44 in turn is pivotally connected with a slidable collar 45 on the shaft 7. Said collar has a reduced upper end 46 on which are positioned four upstanding curved arms 47, each of which pivotally connects as at 48 with the connecting member 49 which is pivotally bolted or pinned to the several cooperating, superposed and spaced track or bracket members 16a so that as the collar is moved by the pitman 44 the trays supported thereon are tilted to an angle of say 45° so that the eggs will be turned. As gear 37 continues to revolve one of the fingers 50 thereon engages the latch and moves it from its slot returning the apparatus to a passive position at the completion of the tilting operation. The eggs are placed in the trays small ends down to facilitate tilting, the mechanism is preferably set to tilt them automatically once every eight hours. Suitable fastening means can be provided to prevent sliding of the trays when tilted.

To further define the operation of the above parts it is pointed out that gear wheel 37 is essentially an idler and is carried around the path of travel of shaft 7 since it is mounted on collar 37a which is keyed to shaft 7 as at 37b to rotate with it. Gear 39 is also free to rotate around shaft 7 and is always in mesh with gear 37. Thus gears 37 and 39 ordinarily simply idle. However gear 39 is notched so that as it travels around the notch comes into the path of the member 43a which engages in the notch and holds gear 39 stationary. Since gear 37 continues to travel or follow in the path of rotational travel of shaft 7, and gear 39 is now stationary and is in mesh with gear 37; then gear 37 will now be rotated and will actuate member 44 to move collar 45 which in turn tilts the trays. In the meantime eccentric 38 which is keyed to shaft 7 to move at all times therewith functions through pitman 40 and dog 41 to move gear 42 step by step until spring 43 comes into contact with member 43a and when spring 43 contacts with member 43a that member is thrown into position to engage into the notch, i. e. it is thrown up into the notch so that as the notch is moved into position the member 43a is moved into position to engage it. This action is positive and is the action that tilts the trays. As the step-by-step movement of gear 42 continues the spring 43 passes member 43a, but member 43a still stays into engagement with the notch in gear 39 until one of the fingers 50, moving around the gear 37 engages member 43a and pushes it down out of the notch to release gear 39 again.

From the foregoing it will be seen that each rectangular member 15—of which there are preferably four, or there may be more—supports a bank of trays, and that each bank of trays is tilted by an arm 47 on the collar 45; there are therefore four arms, but there should be as many arms as there are banks of trays. The construction is simple, efficient and desirable.

Since details of construction, and size, shape and arrangement of parts may be changed to conform to varying requirements of practice, the right to make such changes is reserved provided the same fall within the scope of the appended claims.

I claim:

1. In an incubator, a rotatable vertical shaft, means for rotating said shaft, a frame on said shaft including upper and lower horizontal pieces, and vertical rectangular members on the horizontal pieces, egg trays carried by said vertical members, pivoted bracket members on said vertical members for supporting said trays, said trays having removable supporting and spacing members for normally retaining the eggs in rows with the small ends down, means connecting certain of said bracket members in cooperating series, a slidable collar on the shaft, arms on the collar connecting the same with the means connecting the respective series of brackets, and means for moving said collar up and down on the shaft to tilt the brackets and trays whereby to turn the eggs.

2. In an incubator, a vertical rotatable shaft, means for rotating the shaft, a frame on the shaft including upper and lower horizontal supporting members, vertically arranged substantially rectangular members carried on the horizontal members and extending laterally therefrom, cooperating, opposed tracks arranged in superposed spaced relationship in said vertical members and pivoted thereto, means connecting certain of said tracks so that they pivot in unison, trays removably carried on the tracks, a slidable collar on the shaft having a reduced upper end, arms on said reduced end connected with said connecting means for the tracks, a pitman connected with the collar, and means including gear connections and a trip unit for automatically reciprocating the pitman at stated times to slide said collar on the shaft to tilt said trays.

3. An incubator comprising a cabinet, a frame in the cabinet, a plurality of trays for carrying eggs to be hatched, a vertical shaft in the cabinet on which the frame is carried, a slidable element on the shaft, a plurality of brackets pivotally connected to the frame, means connecting certain of said brackets to form cooperating sets, said trays supported by said brackets, means connecting the sliding element with the sets of brackets to move the same to tilt the said trays to turn the eggs therein when the sliding element is moved up and down on the shaft, and means for moving said sliding element.

4. An incubator, comprising a cabinet, a vertical shaft supported in the cabinet, a frame carried by the shaft, pivoted bracket members carried by the frame, means connecting certain of said bracket members together to form cooperating sets, trays removably carried by the brackets, and means on the shaft for tilting the brackets to turn the eggs in the trays, said means comprising a collar slidable on the shaft with arms operably connected with the means connecting the respective sets of brackets, and means for sliding said collar.

5. In an incubator, a vertical shaft, upper and lower horizontal members carried on the shaft, rectangular vertically positioned frame members on the horizontal members, superposed, spaced L-shaped brackets pivoted on the frames and certain of the said brackets connected together to form cooperating sets, trays on the brackets, and means for tilting said brackets, said means comprising a collar slidable on the shaft, and arms operatively connected with the bracket connecting means of the sets of brackets, and means for sliding said collar.

JOHN MERLIN HEUER.